United States Patent [19]
Tsutsumi

[11] Patent Number: 5,651,508
[45] Date of Patent: Jul. 29, 1997

[54] SPINNING REEL HAVING MECHANISM FOR SUPPORTING A LINE ROLLER ON A BAIL SUPPORT MEMBER

[75] Inventor: Wataru Tsutsumi, Tokyo, Japan

[73] Assignee: Daiwa Seiko, Inc., Tokyo, Japan

[21] Appl. No.: 528,231

[22] Filed: Sep. 14, 1995

[30] Foreign Application Priority Data

Sep. 14, 1994 [JP] Japan ................................. 6-220434
Jun. 2, 1995 [JP] Japan ................................. 7-006350 U

[51] Int. Cl.$^6$ .......................................................... A01K 89/01
[52] U.S. Cl. .......................................................... 242/231
[58] Field of Search ............................... 242/230, 231, 242/232, 233

[56] References Cited

U.S. PATENT DOCUMENTS 5,193,762  3/1993  Takeuchi ................................. 242/232
5,261,627  11/1993  Shinohara ................................. 242/231

FOREIGN PATENT DOCUMENTS 58-194680  12/1983  Japan ................................. A01K 89/01
61-18678   6/1986   Japan ................................. A01K 89/01

*Primary Examiner*—Katherine Matecki
*Attorney, Agent, or Firm*—Sughrue, Mion, Zinn, Macpeak & Seas

[57] ABSTRACT

The invention concerns a spinning reel for fishing and, particularly, a structure for the spinning reel to facilitate the operation of winding a fishline and reversing a bail and prevent a fishline from becoming entangled. In the spinning reel for fishing, a bail support member including a support portion and a bail mounting portion integrally formed with the leading end of the support member is reversibly fitted to the leading end of the rotor support arm of a rotor rotatably mounted on a reel body so as to allow the bail support member to be reversibly positioned on a fishline winding side and a fishline playing-out side. A line roller is installed in between the support portion and the bail mounting portion. The line roller is detachably mounted in between the support portion and the bail support portion in a direction perpendicular to the axial direction of the center axis of the line roller.

7 Claims, 13 Drawing Sheets

SPINNING REEL HAVING MECHANISM FOR SUPPORTING A LINE ROLLER ON A BAIL SUPPORT MEMBER

BACKGROUND OF THE INVENTION

The present invention relates to a spinning reel for fishing and more particularly to a structure for facilitating the operation of not only winding a fishline but also reversing a bail simultaneously with preventing a fishline from becoming entangled.

A conventional spinning reel for fishing includes a semi-annular bail which is mounted, via a bail support member and a bail holder, at the leading ends of a pair of rotor supporting arms provided on a rotor so that the semi-annular bail reversibly pivots between a fishline winding position and a fishline freely playing-out position.

When a handle fitted to the reel body is manually operated to turn the rotor in the fishline-winding direction after the bail is pushed down to the fishline-winding position, the fishline is wound on the spool making a longitudinal reciprocating motion in linking with the rotation of the rotor. When casting is performed after the bail is pushed down to the fishline playing-out position, the fishline wound on the spool is played-out in a spiral manner.

The conventional bail support member is fitted with a line roller for guiding the fishline to the spool as disclosed in, for example, Japanese Utility Model Kokai Publication NO. Sho. 58-194680 or Japanese Utility Model Kokoku Publication No. Sho. 61-18678.

FIG. 17 shows a line roller fitting structure as disclosed in Japanese Utility Model Kokai Publication No. Sho. 58-194680, wherein reference character 1 designates a bail support member. The bail support member 1 includes a support portion 3 pivotably fitted to the leading end of a rotor support arm, and a bail mounting portion 5 integral with the leading end of the support portion 3. A tapped hole 7 is bored in the support portion 3 and a mating groove 9 is provided opposite to the tapped hole 7 in the bail mounting portion 5.

Reference character 11 designates a line roller; and 13 and 15, center pins for supporting the line roller 11. One center pin 13 is fitted in the mating groove, whereas the other center pin 15 is fitted in a screw member 17. Conical recessed receiving faces 13a, 15a are formed at the leading ends of the respective center pins 13, 15.

Recessed portions 19, 21 are formed in both axial end portions of the line roller 11, and the center pins 13, 15 are each allowed to loosely fit in the recessed portions 19, 21. Spherical concentric bulges 23, 25 are provided concentric with respect to the recessed portions 19, 21.

The line roller 11 is mounted such that after the line roller 11 is inserted through the tapped hole 7 so that the line roller 11 is located between the support portion 3 and the bail mounting portion 5 and the one spherical bulge 23 is brought into abutment with the receiving face 13a of the center pin 13, the screw member 17 is screwed into the tapped hole 7 so that the receiving face 15a of the center pin 15 secured to the screw member 17 is brought into abutment with the other spherical bulge 25.

FIG. 18 shows a line roller fitting structure as disclosed in Japanese Utility Model Kokoku Publication No. Sho. 61-18678. In this conventional fitting structure, a tapped hole 33 and an axial hole 35 are respectively provided in a support portion 29 and a bail mounting portion 31 both constituting a bail support member 27, and the line roller 41 is fitted to a bail support member 27 such that a screw member 37 having a support shaft 39 which is integrally molded with the screw member 37 and on which the line roller 41 is fitted, is screwed into the tapped hole 33.

In any conventional line roller fitting structure thus proposed, the tapped hole 7, (33) is provided in the support portion 3, (29) of the bail support member 1, (27), and the line roller 11, (41) is fitted in the direction toward the bail mounting portion 5, (31) through the tapped hole 7, (33).

Therefore, the provision of the tapped hole 7, (33) tends to make the support portion 3, (29) bulky, which adversely affect both the rotational balance of the rotor rotating at high speed during winding and the operation of reversing the bail.

Since the head of the screw member 17, (37) for preventing removal of the line roller 11, (41) protrudes from the support portion 3, (29), there arises a problem in that the fishline is likely to entangle around the protruded head.

SUMMARY OF THE INVENTION

An object of the present invention made in view of the foregoing problems in the art is to provide a spinning reel for fishing and particularly a structure for the spinning reel, which facilitates the fishline winding and bail reversing operation and prevents a fishline from becoming entangled.

In order to accomplish the object above, a spinning reel for fishing according to the invention, wherein a bail support member including a support portion and a bail mounting portion integrally formed with the leading end of the support member is reversibly fitted to the leading end of the rotor support arm of a rotor rotatably mounted on a reel body so as to allow the bail support member to be reversibly positioned on a fishline winding side and a fishline playing-out side and wherein a line roller is installed in between the support portion and the bail mounting portion, is characterized in that the line roller is detachably supported between the support portion and the bail support portion from a direction perpendicular to the axial direction of the center axis of the line roller thus installed in such a manner as to prevent the line roller from slipping off.

Preferably, the line roller is detachably supported between the support portion and the bail support portion from the spool side.

In the spinning reel for fishing, the line roller is mounted in between the support portion and the bail mounting portion from a direction perpendicular to the axial direction of the central axis of the line roller supported by the bail support member. When casting is performed by pushing down the bail toward the fishline playing-out position, the fishline wound on the spool is played-out in a spiral manner. When the bail is reversed toward the fishline winding position, the fishline is guided via line roller to the spool.

When a handle is manually operated to wind up the fishline in that state, the fishline is wound on the spool which makes the traverse movement in linking therewith. Since the support portion can be made more compact than before, the bail support member is set free from adversely affecting the rotational balance of the rotor rotating at high speed during winding and the operation of reversing the bail.

Since it is possible to make the exterior of the bail support member neat in view of design-making, the streamlined external appearance will give anglers and purchasers an agreeable impression.

DETAILED DESCRIPTION OF THE PREFERRED EMBODIMENTS

Referring to the accompanying drawings, a detailed description will subsequently be given of an embodiment of the present invention.

Figure 1:
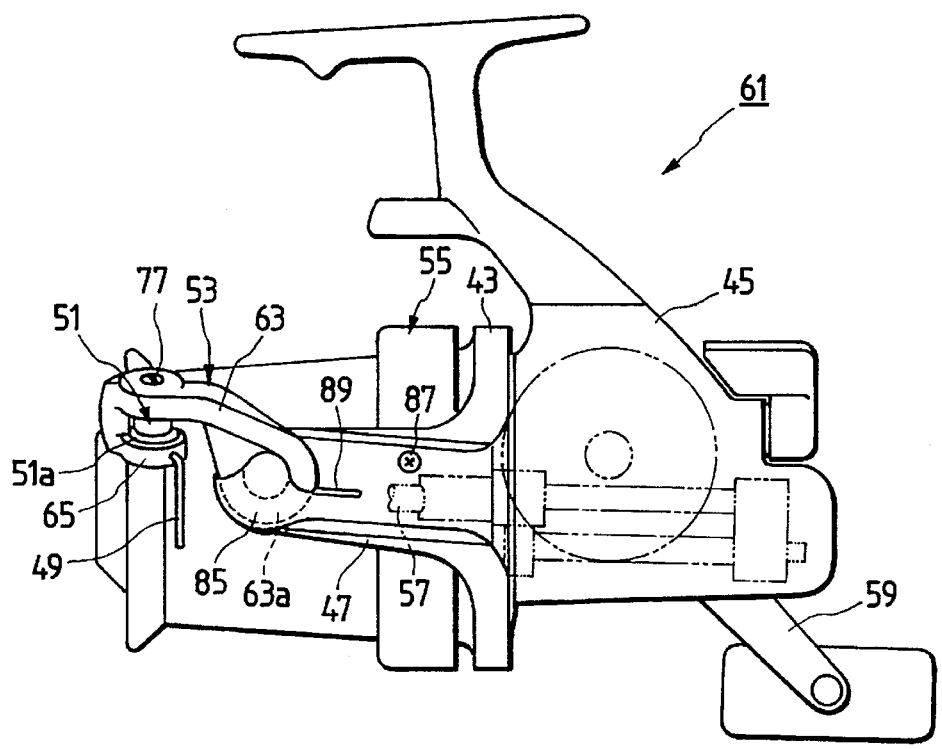
FIG. 1 is an elevational view of a spinning reel for fishing according to a first embodiment of the present invention.

FIGS. 1 through 8 show a spinning reel for fishing according to a first embodiment of the present invention. In FIG. 1, reference character 43 designates a rotor rotatably mounted on a reel body 45, and a pair of rotor support arms 47 integral with the rotor 43 are projected toward the tip of a fishing rod. A semi-annular bail 49 is arranged at the leading ends of the rotor support arms 47 via a bail support member 53 for rotatably supporting a line roller 51 and a bail holder (not shown) diametrically opposite to the bail support member 53 in such a manner that the bail 49 can be reversibly positioned on a fishline winding side and a fishline playing-out side.

Further, reference character 55 designates a spool installed coaxially with the rotor 43 and the spool 55 is supported by a spool shaft 57 fitted to the reel body 45, the spool shaft 57 being capable of making reciprocating movement. When the rotor 43 is turned in the fishline winding direction by manually operating a handle 59 after the bail is pushed down to the fishline winding side, the fishline is wound on the spool 55 which makes the reciprocating movement in the longitudinal direction in linking with the rotation of the rotor 43.

Although the basic structure of the spinning reel 61 according to the embodiment of the invention is similar to that of the commonly known spinning reel, improvements have been made to the specific portion of the spinning reel 61 as will be described in detail below.

Figure 2:
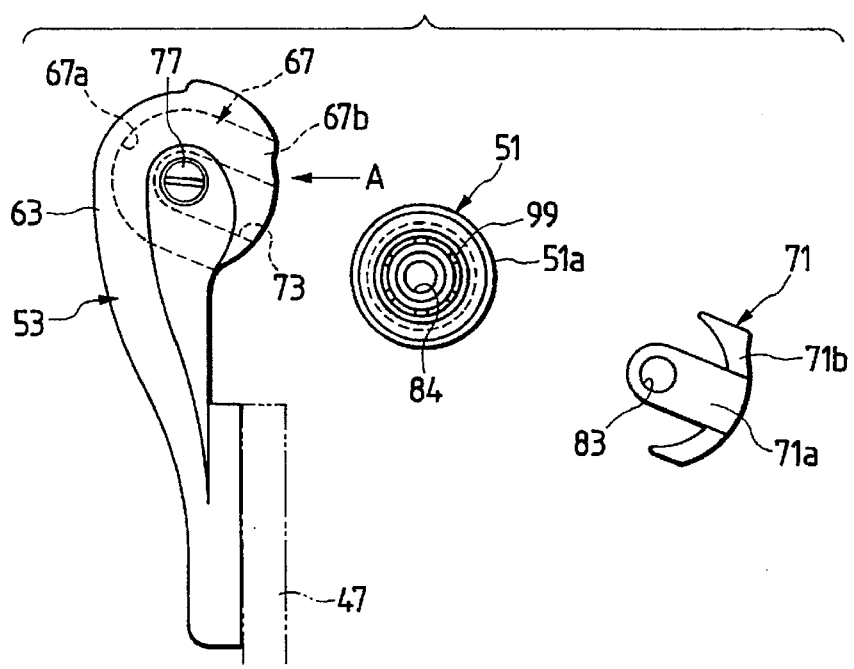
FIG. 2 is an exploded side view of a line roller fitting structure.
Figure 3:
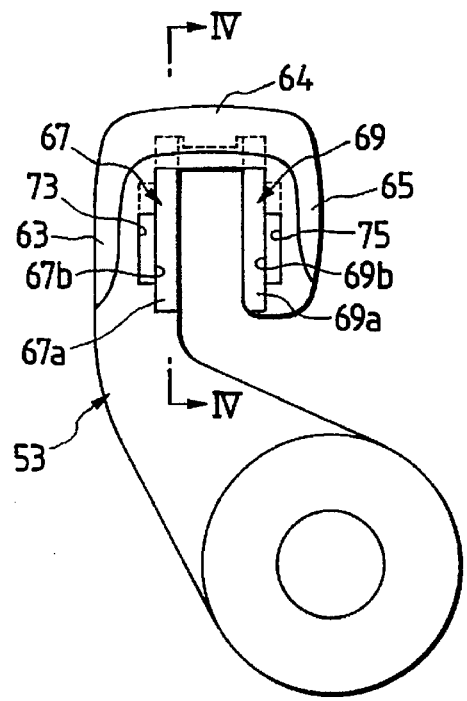
FIG. 3 is a view in direction of arrow A of FIG. 2.

More specifically, the bail support member 53 includes, as shown in FIGS. 2 and 3, a support portion 63 pivotably fitted to the leading end of the rotor support arm 47, and a bail mounting portion 65 integrally connected to the leading end of the support portion 63 through a coupling portion 64. The bail mounting portion 65 is arranged opposite to the support portion 63.

Figure 4:
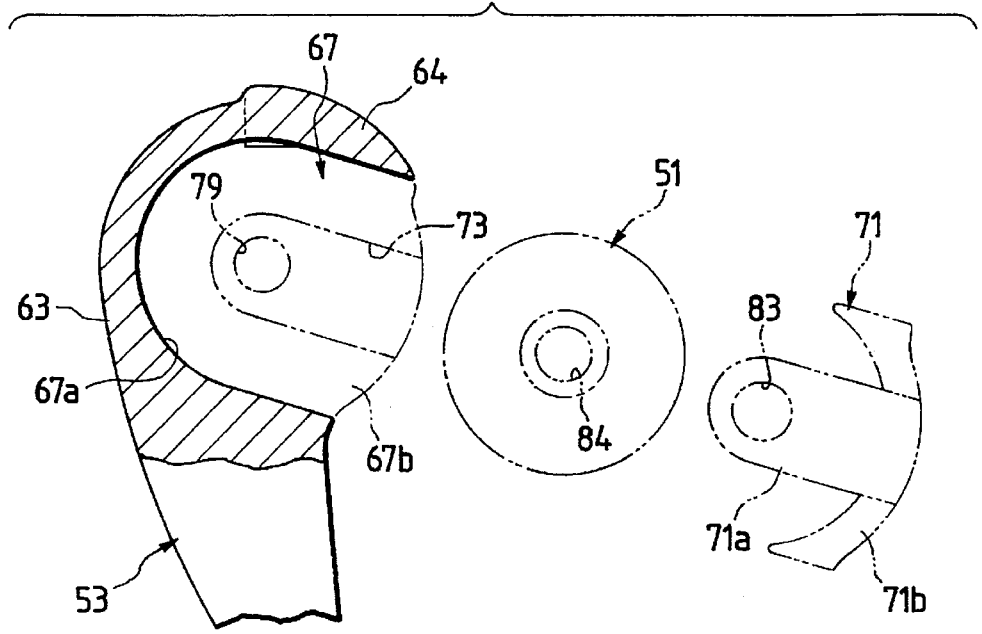
FIG. 4 is an end view taken on line IV—IV of FIG. 3.

Further, recessed portions 67, 69 for detachably receiving the line roller therein are provided respectively in opposite end faces of the support portion 63 and the bail mounting portion 65 as shown in FIGS. 2 through 4. The recessed portions 67, 69 have the same shape and opened toward the spool 55. That is, each of peripheral walls 67a, 69a of the recessed portions 67, 69 is formed into a substantially U-shape to provide a cut-away portion through which the outer peripheral portion 51a on each side of the line roller 51 is insertable into the respective recessed portion 67, 69 and which is directed toward the spool 55. Grooved portions 73, 75 into which arm portions 71a of a cover member 71 is slidably insertable are formed in the bottoms 67b, 69b of the recessed portion 67, 69 so that each of the grooved portions 73, 75 extends from the center of the respective opening 67, 69 to the cut-way portion of the peripheral wall 67a, 69a.

As shown in FIG. 2, the cover member 71 is made up of two arm portions 71a projected in the same direction from a cover body 71b formed to conform with the outer configurations of the support portion 63 and the bail mounting portion 65. The line roller 51 is installed in between the support portion 63 and the bail mounting portion 65 such that the line roller 51 is inserted into the recessed portions 67, 69 as shown in FIGS. 5 and 6 in the direction from the side of the spool 55, i.e. in the direction orthogonal to the axial direction of the central axis of the line roller 51 installed in between the support portion 63 and the bail mounting portion 65, and thereafter the cover member 71 is forced into the recessed portions 67, 69 with the arm portions 71a being fitted into and guided by the grooved portions 73, 75.

The arm portions 71a are provided with insertion holes 83 for a removal preventive or stop screw 77, which correspond in position to an insertion hole 79 and an insertion groove 81 respectively provided in the support portion 63 and the bail mounting portion 65. First, the line roller 51 is inserted into the openings 67, 69 and then the stop screw 77 is tightened via the hole 84 of the line roller 51, the above-mentioned holes 79, 83 and the groove 81, so that the line roller 51 and the cover member 71 are fitted in place to the bail support member 53.

Figure 5:
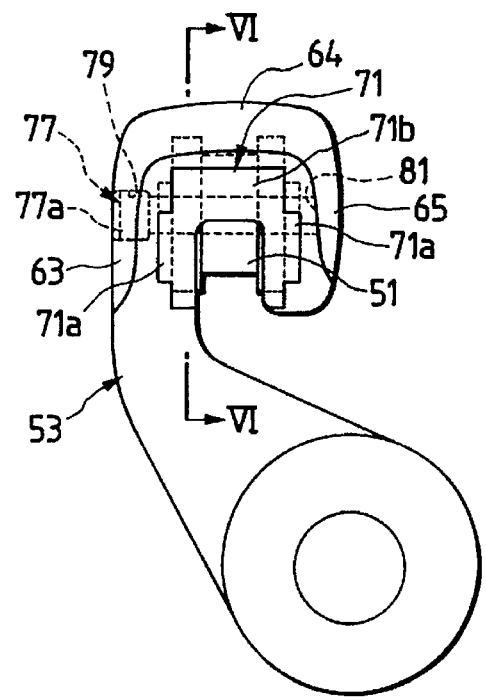
FIG. 5 is a rear elevational view of a bail support member.
Figure 6:
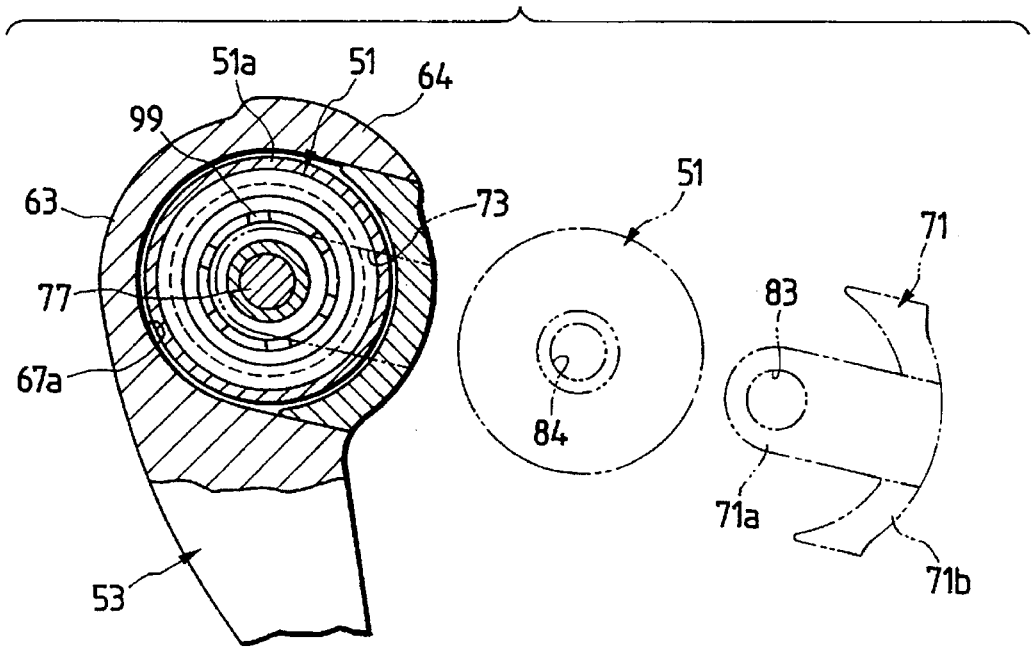
FIG. 6 is an end view taken on line VI—VI of FIG. 5.

As shown in FIG. 5, the outer periphery of the head 77a of the stop screw 77 and the inner periphery of the hole 79 are each formed as thread, and when the stop screw 77 is screwed into the hole 79, the head 77a is received into the hole 79 and prevented from protruding from the support portion 63.

As shown in FIG. 1, further, a cover member 85 for covering the base 63a of the support portion 63 is secured with a machine screw to the rotor support arm 47 holding the bail support member 53. The cover member 85 is designed to prevent the fishline from intruding in between the rotor support arm 47 and the base 63a.

As shown in FIG. 1, further, the leading end of the cover member 85 is made semicircular in conformity with the base 63a of the support portion 63 and besides provided with a slit 89 so as not to impede the reversing operation of the bail support member 53 toward either of the fishline winding side and the fishline playing-out side.

Figure 7:
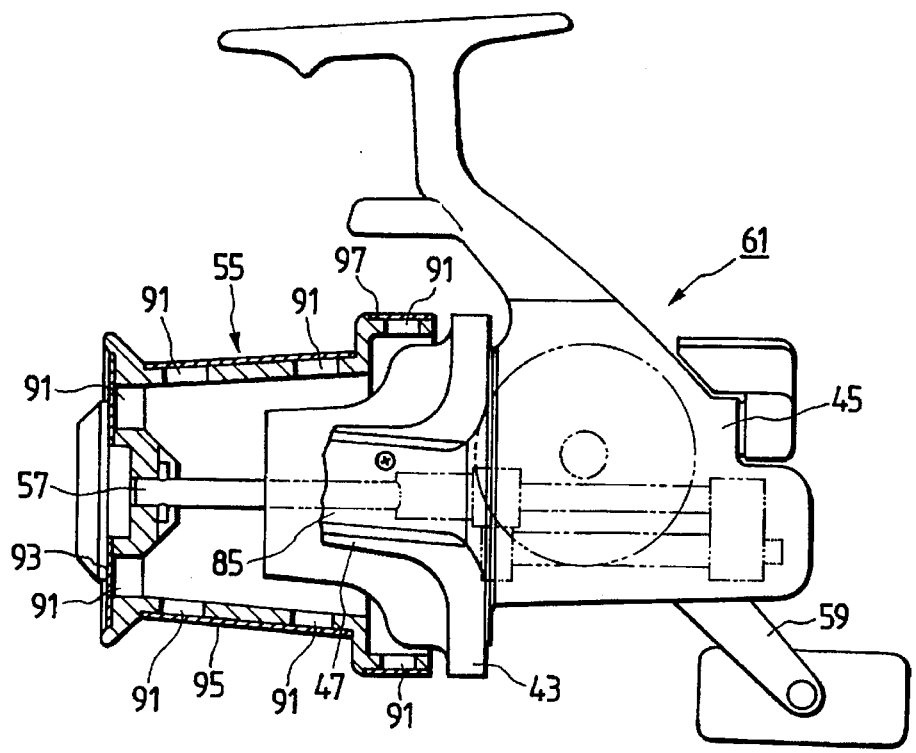
FIG. 7 is a sectional view of the principal part of the spinning reel for fishing of FIG. 1.
Figure 8:
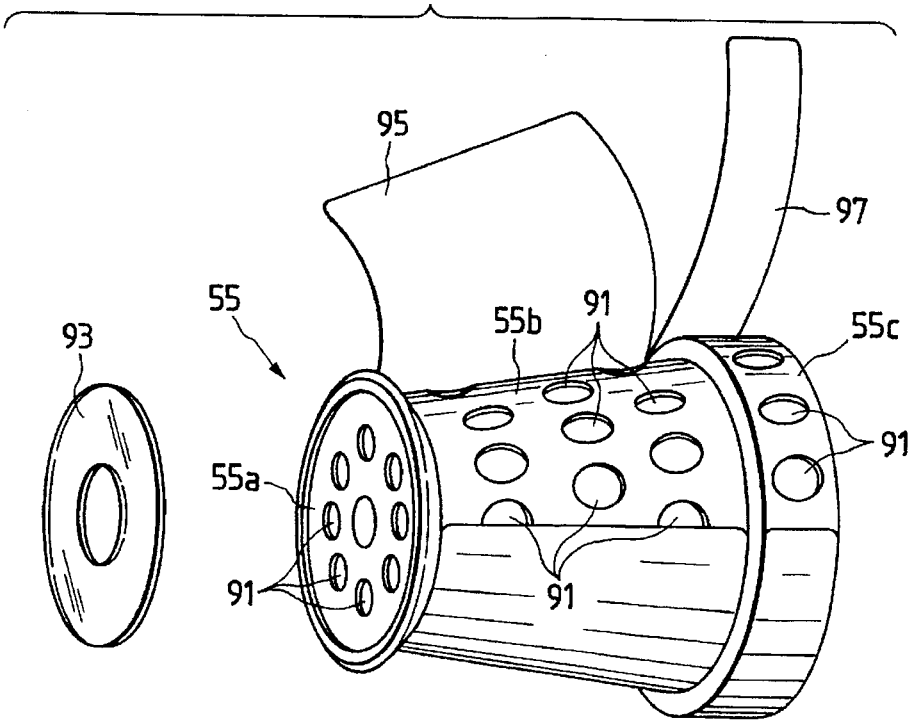
FIG. 8 is an exploded perspective view of a spool.

The spool 55 according to this embodiment of the invention has, as shown in detail in FIGS. 7 and 8, a front portion 55a, a fishline winding body 55b and a skirt portion 55c positioned in the rear of the fishline winding body 55b, each having many punched holes 91. Moreover, a disk-shaped transparent plate 93 is adhesion-bonded to or resiliently mated with the front portion 55a, and name plates 95, 97 printed with the model of the spinning reel 61, product and trade names and so forth are adhesion-bonded onto the fishline winding body 55b and the skirt portion 55c. With so many punched holes 91, the spinning reel 61 is made lightweight and with the transparent plate 93 and the punched holes 91, the interior of the spool 55 can be observed visually, which enables checking the tangling of the fishline on the spool shaft 57, the intrusion of foreign substances and their adhering conditions and the like.

The name plates 95, 97 may be either transparent or translucent. A non-slip plate made of elastic material having an uneven surface in place of the name plate 95 to be adhesion-bonded onto the fishline winding body 55b may otherwise be pasted on the fishline winding body 55b. Further, the punched holes 91 may be provided in either front portion 55a or fishline winding body 55b only.

Line rollers are generally various ceramics or made of hard material such as copper alloy treated with rigid plating, and the line roller 51 above is also made of such hard material. The line roller 51 may have a fishline guide portion the cross-sectional shape of which is not only straight as in the embodiment but also concave curved, or straightly constricted to present a V-letter shape.

Further, reference character 99 in FIG. 2 designates a ball bearing incorporated in the line roller 51.

In the spinning reel 61 thus constructed according to this embodiment of the invention, the line roller 51 is fitted to the bail support member 53 through the steps of inserting the line roller 51 in between the recessed portions 67, 69 from the spool side, forcing the cover member 71 into the recessed portions 67, 69 with the arm portions 71a being slidingly guided by the grooved portions 73, 75, and tightening the stop screw 77 via the holes 79, 83, 84 and the groove 81.

When casting is performed upon the bail 49 is pushed down to the fishline playing-out position, the fishline wound on the spool 55 is played-out in a spiral manner. When the bail 49 is reversed to the fishline winding position, the fishline is guided via line roller 51 to the spool 55. When the handle 59 is manually operated to wind up the fishline in that state, the fishline is wound on the spool 55 making the reciprocating movement in linking with the rotation of the rotor 43, and the cover member 85 prevents the fishline from intruding in between the rotor support arm 47 and the base 63a during winding of the fishline.

Figure 17:
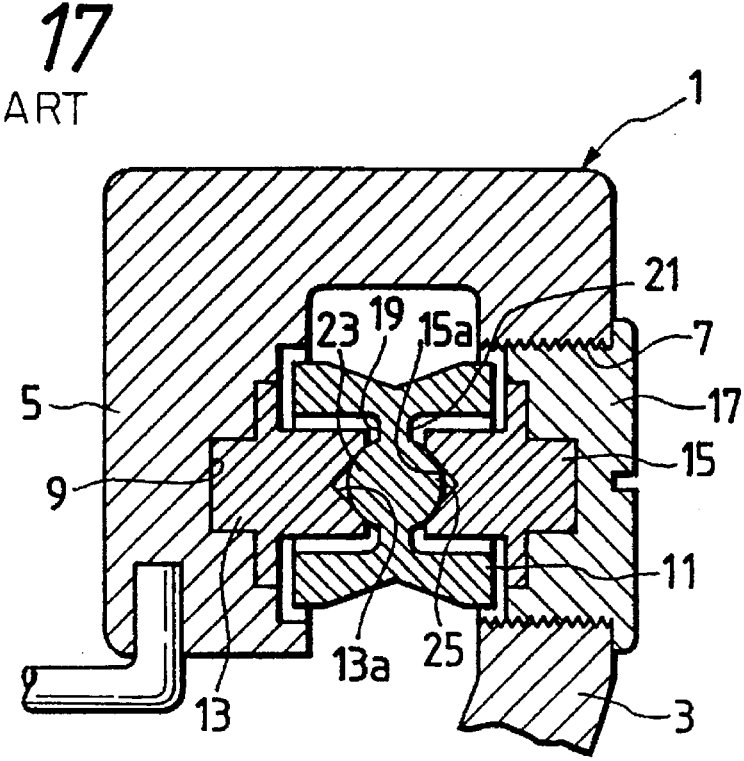
FIG. 17 is a sectional view of a conventional line roller fitting structure.
Figure 18:
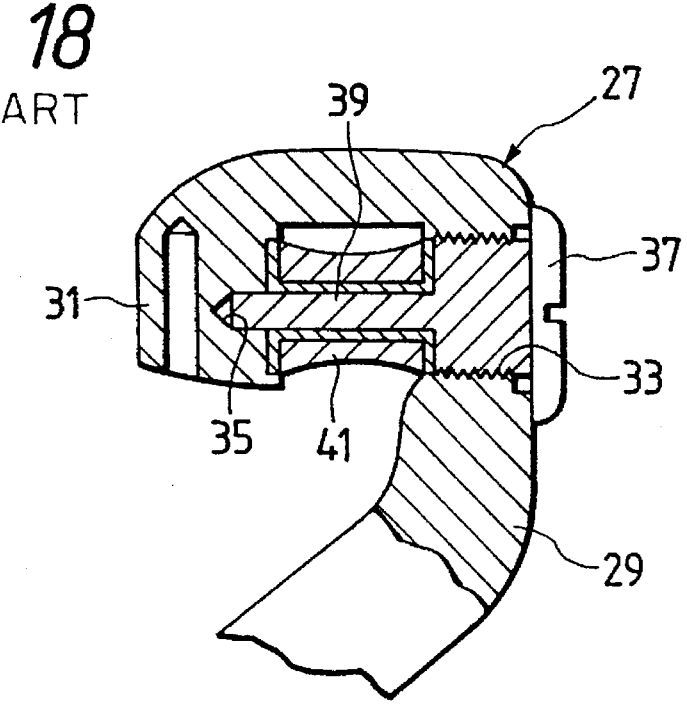
FIG. 18 is a sectional view of another conventional line roller fitting structure.

This embodiment of the present invention is thus different in construction from the conventional spinning reel shown in FIGS. 17 and 18 in that the recessed portions 67, 69 for detachably mounting the line roller are provided in the opposite end faces of the support portion 63 and the bail mounting portion 65 and opened toward the spool 55, whereby the line roller 51 is made detachable from the recessed portions 67, 69 through the cut-away portions provided at the spool side. Thus, the tapped hole 7, 33 required in the conventional arrangement is no longer necessary at the support portions 63 of the present embodiment.

Therefore, the support portion 63 can be made more compact in comparison to the conventional arrangement, and thus the bail support member 53 does not adversely affects the rotational balance of the rotor 43 rotating at high speed during winding and the reversing operation for the bail 49.

According to this embodiment of the invention, moreover, the head 77a of the stop screw 77 for preventing the removal of the line roller 51 is not protruded from the support portion 63 and besides the exterior of the support portion 63 can be formed into the smooth contour, so that entanglement of the fishline can be effectively prevented. Since it is possible to make the exterior of the bail support member neat in view of design-making, the external appearance will give anglers and purchasers an agreeable impression.

According to this embodiment of the invention, further, the rotor support arm 47 holding the bail support member 53 is provided with the cover member 85 for covering the base 63a of the support portion 63, whereby the fishline will not allowed to intrude in between the rotor support arm 47 and the base 63a.

In addition, many punched holes 91 made in the spool 55 contribute to rendering the spinning reel 61 lightweight, the interior of the spool 55 can be observed visually through the transparent plate 93 and the punched holes 91 with the effect of checking the tangling of the fishline on the spool shaft 57, the intrusion of foreign substances and their adhering conditions and the like. The advantage is that maintainability is improvable.

The cover member 71 is not an essential component and may be omitted. The line roller 51 may be mounted on the bail support member 53 with only the stop screw 77.

FIGS. 9 through 12 show a spinning reel for fishing according to a second embodiment of the present invention. The cover member 71 and the stop screw 77 have been used to mount the line roller 51 on the bail support member 53 according to the first embodiment of the invention. In contrast, only the cover member is used to prevent the removal of the line roller without using the stop screw 77 according to this embodiment of the invention.

Referring to the drawings, a description will subsequently be given of this embodiment of the invention, wherein what is other than the construction of the invention is similar to that of the first embodiment thereof, what is relevant to the invention will mainly be described, and like reference characters are given to like component parts according to the first embodiment of the invention with the omission of description thereof.

Figure 9:
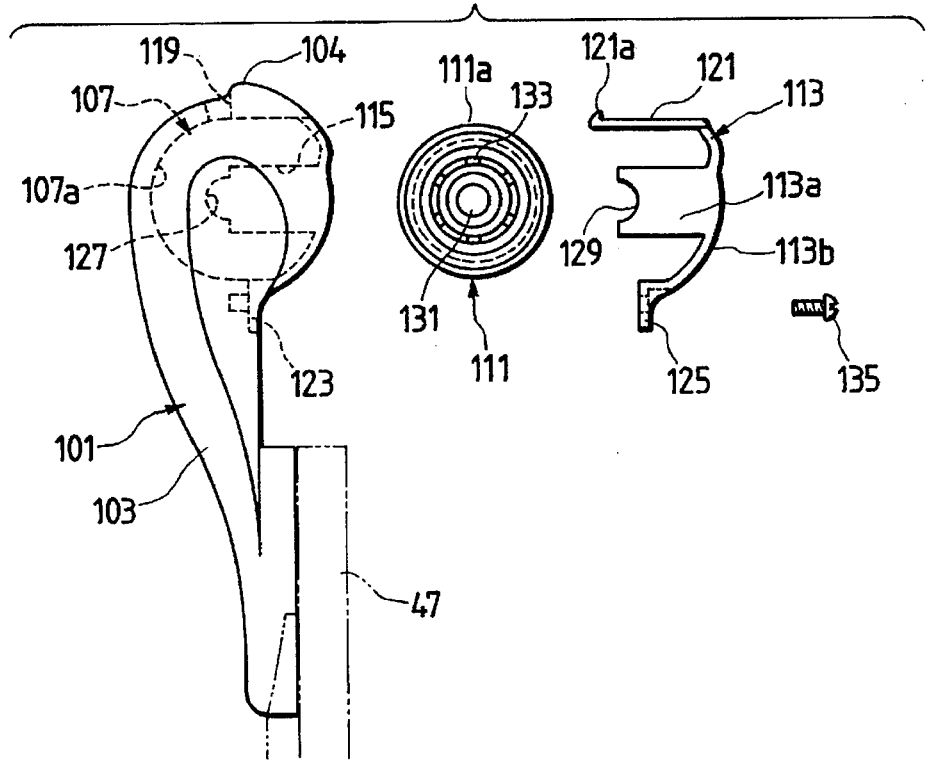
FIG. 9 is an exploded side view of a line roller fitting structure in a spinning reel for fishing according to a second embodiment of the present invention.
Figure 10:
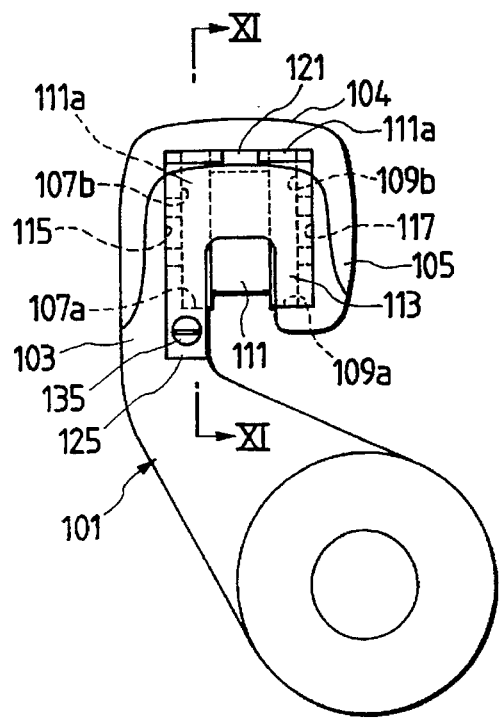
FIG. 10 is a rear elevational view of a bail support member.

In FIG. 9, reference character 101 designates a bail support member and as shown in FIG. 10, like the bail support member 53, the bail support member 101 includes a support portion 103 rotatably fitted to the leading end of the rotor support arm 47, and a bail mounting portion 105 integral with the leading end of the support portion 103 via a coupling portion 104. The bail mounting portion 105 is arranged opposite to the support portion 103.

Further, recessed portions 107, 109 for detachably mounting the line roller therein are provided respectively in opposite end faces of the support portion 103 and the bail mounting portion 105 as shown in FIGS. 9 through 12. The recessed portions 107, 109 are similar in shape to each other and opened toward the spool 55 through cut-away portions. The peripheral walls 107a, 109a of the recessed portions 107, 109 are substantially U-shaped to present the cut-way portions through which the outer peripheral portions 111a on both sides of a line roller 111 can access into the insides of the respective recessed portions 107, 109. Grooved portions 115, 116 in which the arm portions 113a of a cover member 113 slidingly fit are formed in the bottoms 107b, 109b of the recessed portions 107, 109 and extend from the center of the recessed portions 107,109 to the cut-away portions at the spool side, respectively.

Figure 11:
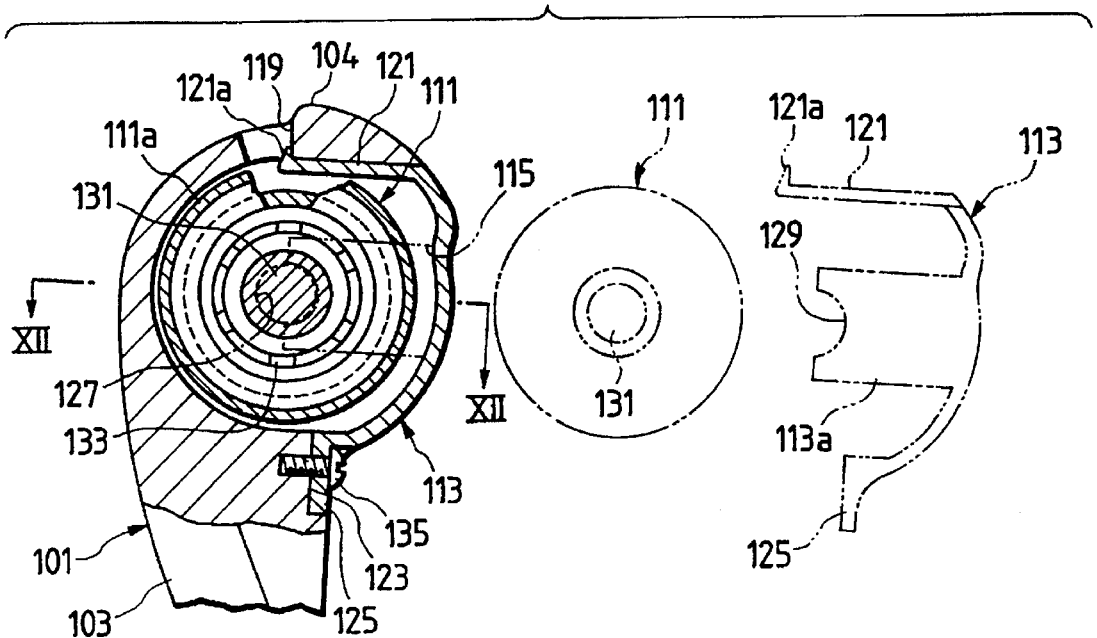
FIG. 11 is a sectional view taken on line XI—XI of FIG. 10.
Figure 12:
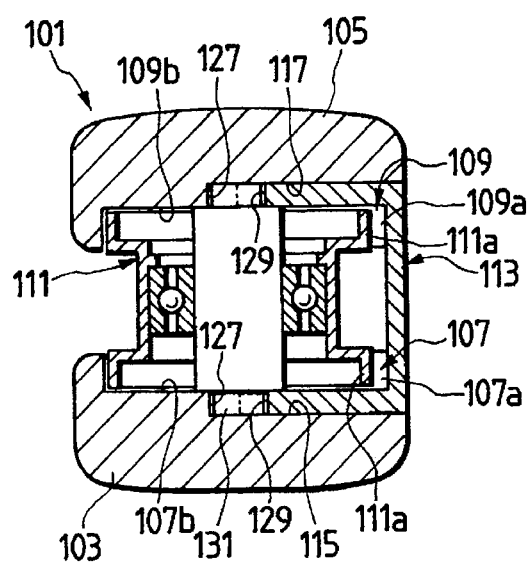
FIG. 12 is a sectional view taken on line XII—XII of FIG. 11.

As shown in FIGS. 9 and 11, the cover member 113 is such that two arm portions 113a are projected in the same direction from a cover body 113b in conformity with the outer configurations of the support portion 103 and bail mounting portion 105. Moreover, a mating piece 121 whose leading end has a mating projection 121a for mating with a notch 119 in the coupling portion 104 is provided at the upper portion of the cover body 113b and as shown in FIGS. 9 and 10, a joining piece 125 to be bolted to a joint 123 provided in the lower edge portion of the recessed portion 107 on the support portion 103 is formed in the lower portion of the cover body 113b.

As shown in FIG. 9, further, semicircular support portions 127, 129 are respectively formed at the inner leading ends of the grooved portions 115, 117 and at the leading end of the arm portions 113a of the cover member 113. Both the support portions 127, 129 are made to hold a support shaft 131 fitted in the center of the line roller 111 onto the bail support member 101 through the steps of inserting the line roller 111 in between the recessed portions 107, 109 from the spool side, fitting the arm portions 113a in the grooved portions 115, 117, mating the notch 119 of the coupling portion 104 with the mating projection 121a, and bolting the joining piece 125 to the joint 123.

In FIG. 9, reference character 133 designates a ball bearing contained in the line roller 111; and 135, a bolt for bolting the joining piece 125 to the joint 123.

According to this embodiment of the invention, the line roller 111 is first inserted into the recessed portions 107, 109 from the spool side and thereafter, while the arm portions 113a are fittingly slide along the grooved portions 115, 117, the cover member 113 is forced into the recessed portions 107, 109, and the mating projection 121a of the joining piece 121 is mated with the notch 119 provided in the coupling portion 104 to bolt the joining piece 125 to the joint 123. Both the support portions 127, 129 in combination hold the support shaft 131, so that the line roller 111 is fitted to the bail support member 101 in place.

When casting is performed upon pushing down the bail 49 to the fishline playing-out position, the fishline wound on the spool 55 is played-out in a spiral manner. When the bail 49 is reversed to the fishline winding position, the fishline is guided via line roller 111 to the spool 55. When the handle 59 is manually operated to wind up the fishline in that state, the fishline is wound on the spool 55 which makes the linked reciprocating movement.

This embodiment of the present invention is thus different in construction from the conventional spinning reel shown in FIGS. 17 and 18 in that the recessed portions 107, 109 for use in detaching mounting of the line roller are provided in the opposite end faces of the support portion 103 and the bail mounting portion 105 and opened toward the spool 55 and that the line roller 111 is made detachable from the recessed portions 107, 109 through the cut-away portions at the spool side, whereby the support portion 103 of the present embodiment can dispense with the tapped holes 7, 33 required in the conventional arrangement.

Therefore, the support portion 103 can be made more compact than that in the conventional arrangement and the bail support member 101 is set free from adversely affecting the rotational balance of the rotor 43 rotating at high speed during winding and the reversing operation for the bail 49. Since the exterior of the support portion 103 can be made smooth, the fishline is effectively prevented from becoming entangled and besides the advantage is that the exterior of the bail supporting member can be made neat in view of design-making.

FIGS. 13 through 16 show a spinning reel for fishing according to a third embodiment of the present invention. According to this embodiment of the invention, the line roller is supported by bolting the cover member to the bail support member with two bolts in place of the mating piece 121 according to the second embodiment of the invention.

Referring to the drawings, a description will subsequently be give of this embodiment of the invention, wherein like reference characters are given to like component parts according to the preceding embodiments of the invention with omission of description thereof.

Figure 13:
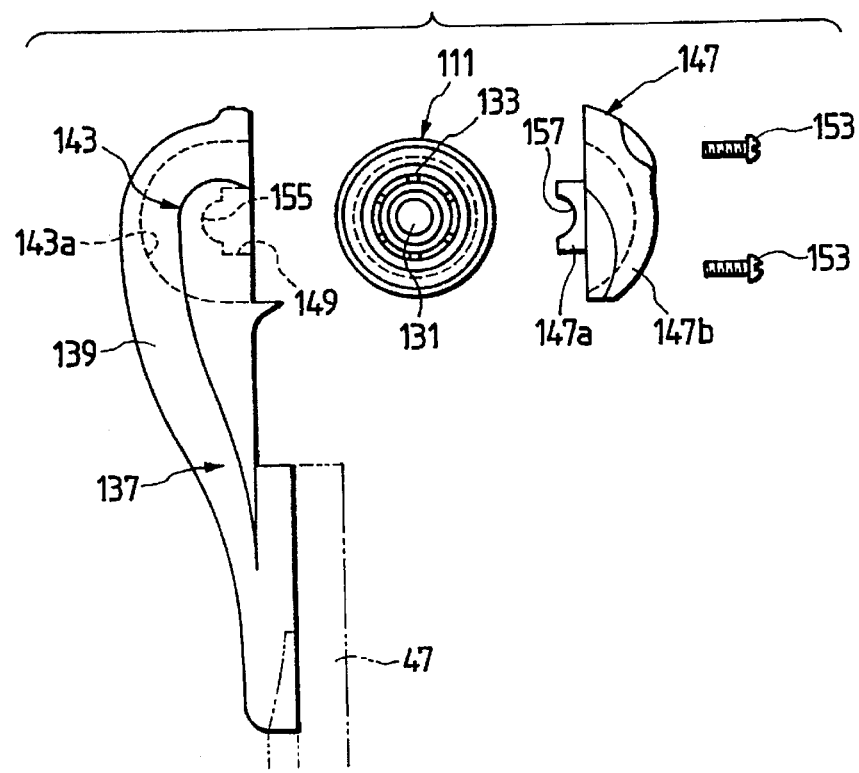
FIG. 13 is an exploded side view of a line roller fitting structure in a spinning reel for fishing according to a third embodiment of the present invention.
Figure 14:
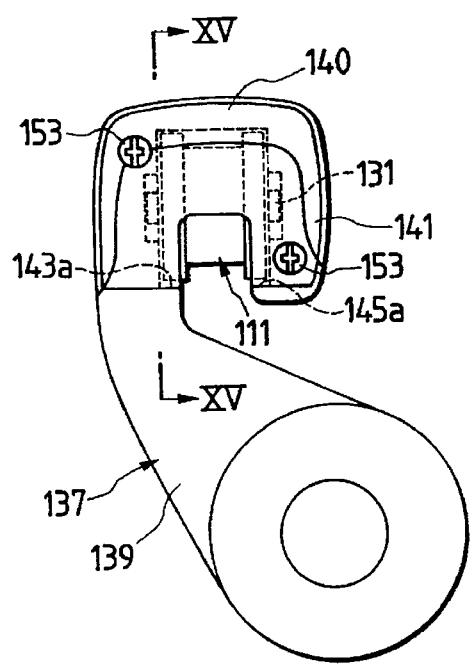
FIG. 14 is a rear elevational view of a bail support member.

In FIG. 13, reference character 137 designates a bail support member, and as shown in FIG. 14, the bail support member 137 includes a support portion 139 rotatably fitted to the leading end of the rotor support arm 47, and a bail mounting portion 141 integral with the leading end of the support portion 139 via a coupling portion 140. The bail mounting portion 141 is arranged opposite to the support portion 139.

Further, recessed portions 143, 145 for use in detachably mounting the line roller are provided respectively in opposite end faces of the support portion 139 and the bail mounting portion 141 as shown in FIGS. 13 through 16. The recessed portions 143, 145 are similar in shape to each other, and provided with cut-away portions so as to be opened toward the spool 55. That is, each of the peripheral walls 143a, 145a of the recessed portions 143, 145 is substantially U-shaped to present the cut-away portion through which the outer peripheral portion 111a on each side of the line roller 111 are passed into the interior of the recessed portion 143, 145. Grooved portions 149, 151 in which the arm portions 147a of a cover member 147 slidably fits are formed in the bottom portions 143b, 145b of the recessed portion 143, 145 and extend from the center of the recessed portions 143, 145 to the cut-away portions at the spool side, respectively.

Figure 15:
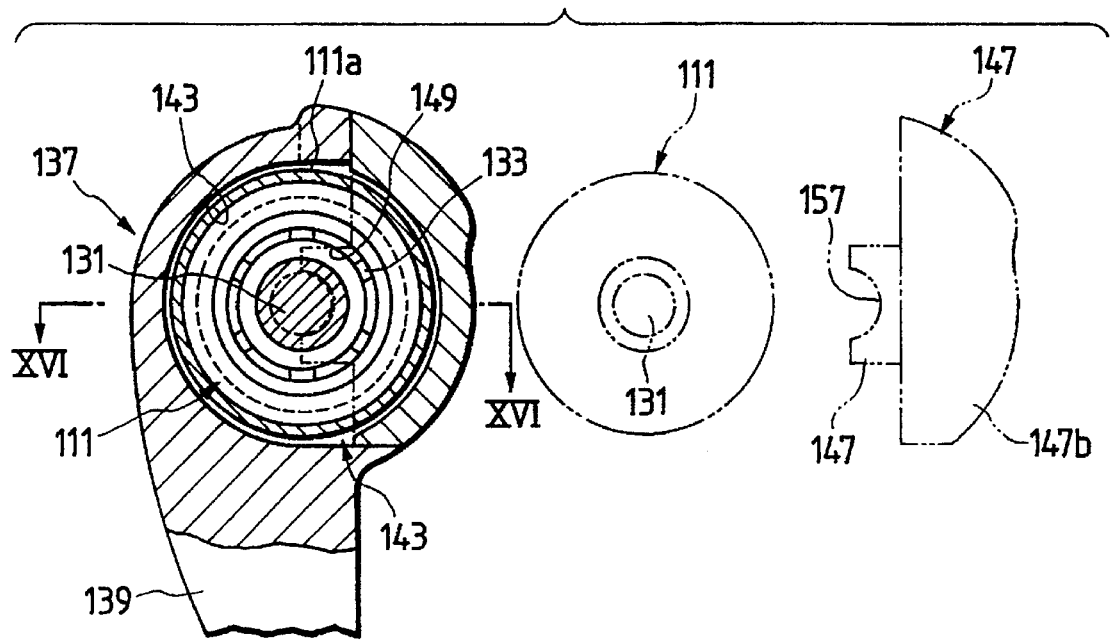
FIG. 15 is a sectional view taken on line XV—XV of FIG. 14.

As shown in FIGS. 13 and 15, the cover member 147 is such that two arm portions 147a are projected in the same direction from a cover body 147b formed in conformity with the outer configurations of the support portion 139 and bail mounting portion 141. The cover member 147 is fitted to the leading end of the bail support member 137 by tightening two bolts onto the spool sides of the support portion 139 and bail mounting portion 141.

Figure 16:
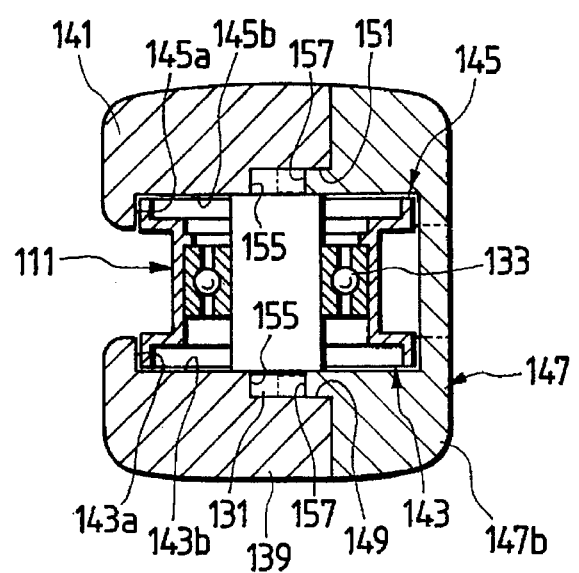
FIG. 16 is a sectional view taken on line XVI—XVI of FIG. 15.

As shown in FIGS. 13 and 16, further, semicircular support portions 155, 157 are respectively formed at the inner leading ends of the grooved portions 149, 151 and at the leading end of the arm portions 147a. The support portions 155, 157 in combination hold the support shaft 131 of the line roller 111, in such a manner that after the line roller 111 is inserted into the recessed portions 143, 145 from the spool side, the cover member 147 is inserted into the recessed portions 143, 145 with the arm portions 147a being slidingly guided by the grooved portions 149, 151 and then tightened to the bail support member 137 with the bolts 153.

According to this embodiment of the invention, the line roller 111 is first inserted into the recessed portions 143, 145 from the spool side, and with the arm portion 147a be fitted in the grooved portions 143, 145, the cover member 147 is forced into the recessed portions 107, 109, and bolted to the bail support member 137. The support portions 155, 157 in combination thus hold the support shaft 131, so that the line roller 111 is fitted to the bail support member 137 in place.

When casting is performed upon the bail 49 is pushed down to the fishline playing-out position, the fishline wound on the spool 55 is played-out in a spiral manner. When the bail 49 is reversed to the fishline winding position, the fishline is guided via line roller 111 to the spool 55. When the handle 59 is manually operated to wind up the fishline in that state, the fishline is wound on the spool 55 which makes the reciprocating movement in linking with the rotation of the rotor.

This embodiment of the present invention is thus different in construction from the conventional spinning reel shown in FIGS. 17 and 18 in that the recessed portions 143, 145 for the removable attachment of the line roller are provided in the opposite end faces of the support portion 139 and bail mounting portion 141 and opened toward the spool 55 and that the line roller 111 in the openings 143, 145 is made detachable in the direction toward the spool 55, whereby the tapped holes 7, 33 required in the conventional arrangement is no longer necessary at the support portion 139 of the present embodiment.

Therefore, the support portion 139 can be made more compact in comparison to the conventional arrangement, and the bail support member 137 is free from adversely affecting the rotational balance of the rotor 43 rotating at high speed during winding and the reversing operation for the bail 49. Since the exterior of the support portion 103 can be made smooth, the fishline is effectively prevented from becoming entangled and besides the advantage is that the exterior of the bail supporting member can be made neat in view of design-making.

According to the aforementioned embodiments of the invention, the recessed portions used for detachably mounting the line roller and opened to the spool side are provided in the opposite end faces of the support portion and bail mounting portion, and the line roller in the recessed portions is made detachable from the spool side. However, the present invention is not restricted to the construction of any embodiment thereof as long as the line roller can be supported in between the support portion and the bail mounting portion and made detachable therefrom in the direction substantially perpendicular to the center axis of the line roller located in place. For example, the construction of the present invention may be modified so that the line roller is removable from the leading end of the bail support member 137.

Figure 19:
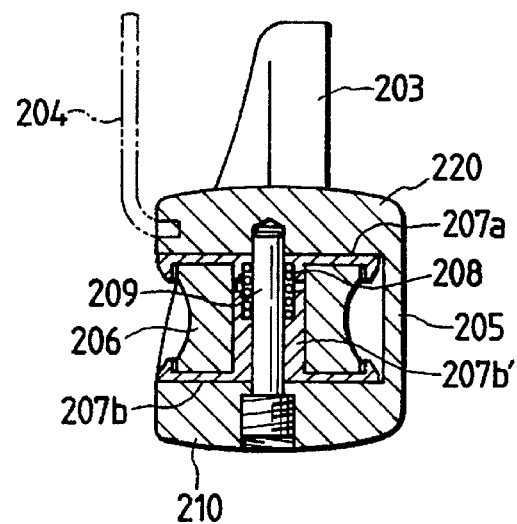
FIG. 19 is a sectional view of a line roller fitting structure in a spinning reel for fishing according to a fourth embodiment of the present invention.
Figure 20:
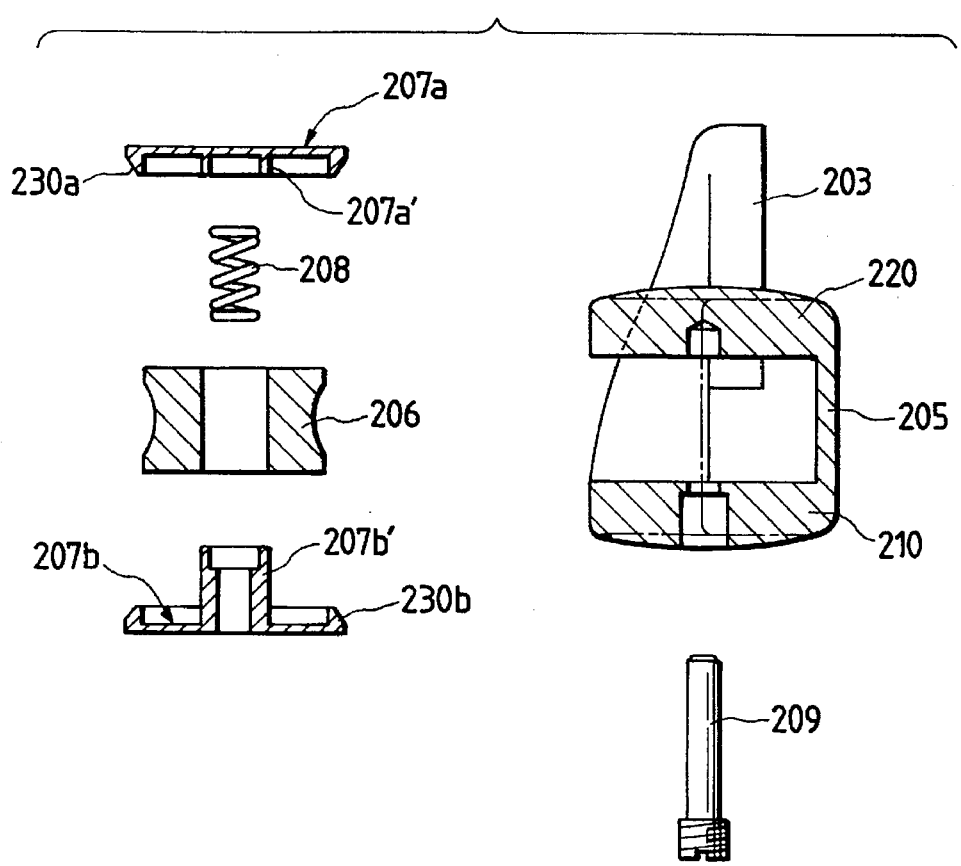
FIG. 20 is an exploded, sectional view of the line roller fitting structure shown in FIG. 19.
Figure 21:
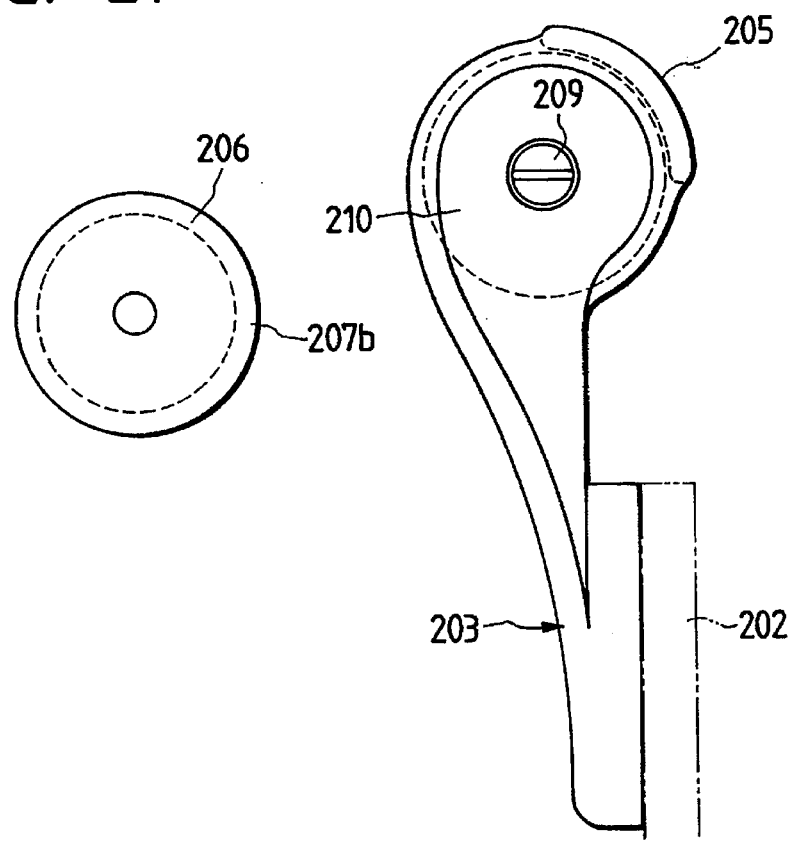
FIG. 21 is a side view of the line roller fitting structure shown in FIG. 19.

FIGS. 19 to 21 show a line roller fitting structure according to a fourth embodiment of the present invention. As similarly to the above-described embodiments, a bail support member 203 includes a support portion 210 pivotably supported on a leading end of a support arm 202 provided on a rotor of a spinning reel, and a bail mounting portion 220 integrally connected to the leading end of the support portion 210 though a coupling portion 205. Reference numeral 204 designates a bail fixed to the bail mounting portion 220. In this embodiment, the recessed portions, for instance designated by the reference numerals 67, 69 in the first embodiment, are not formed in opposite end faces of the support portion 210 and the bail mounting portion 220. In contrast, a pair of cover members 207a and 207b are provided on respective axial ends of a line roller 206. Each of the cover members 207a and 207b has an annular protrusion 230a, 230b for circumscribing and covering a peripheral edge portion on each axial end of the line roller 206 when it is mounted in place. The line roller 206 is mounted to the bail support member 203 in the following manner: As shown in FIG. 20, the cover members 207a and 207b are fitted to the line roller 206 through central shaft portions 207a' and 207b' of the cover members 207a and 207b with a spring member 208 interposed between the central shaft portions 207a' and 207b'. Then, the cover members 207a and 207b are depressed to contact with respective axial ends of the line roller 206 against the biasing force of the spring member 208, and under this condition the line roller 208 together with the cover members 207a and 207b is inserted into the space defined by the opposite end faces of the support portion 210 and the bail mounting portion 220 in the direction orthogonal to an axis about which the line roller 206 is rotatably supported by the bail support member 203. When the depression force is removed after the line roller 206 has been inserted into the space, the cover members 207a and 207b are brought into contact with respective opposite end faces of the support portion 210 and the bail mounting portion 220 due to biasing force of the spring member 208 while the annular protrusions 230a and 230b cover the respective peripheral edge portions of the line roller 206. Thereafter, a screw 209 is passed through the support portion 210, central shaft portions 207a, 207b and bail mounting portion 220 and threadingly tightened to the support portion 210 so as to detachably support the line roller 206 to the bail support member 203.

Figure 22:
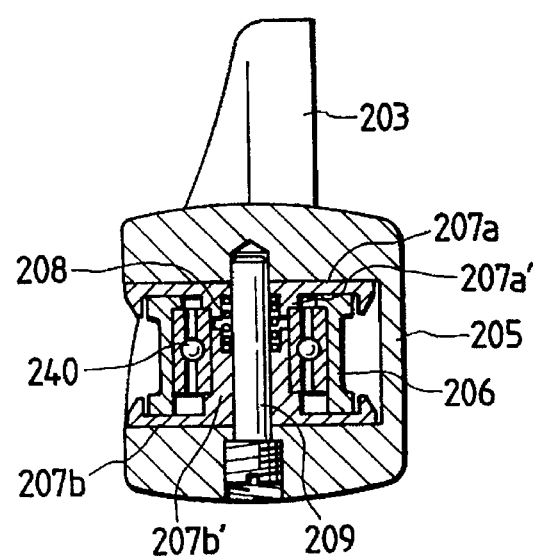
FIG. 22 is a sectional view of a line roller fitting structure in a spinning reel for fishing according to a fifth embodiment of the present invention.

FIG. 22 shows a line roller fitting structure according to a fifth embodiment of the present invention. In this embodiment, the line roller 206 is rotatably supported on the central shaft portions 207a' and 207b' of the cover members 207a and 207b through a ball bearing 240. The other construction of this embodiment is the same as the fourth embodiment.

Figure 23:
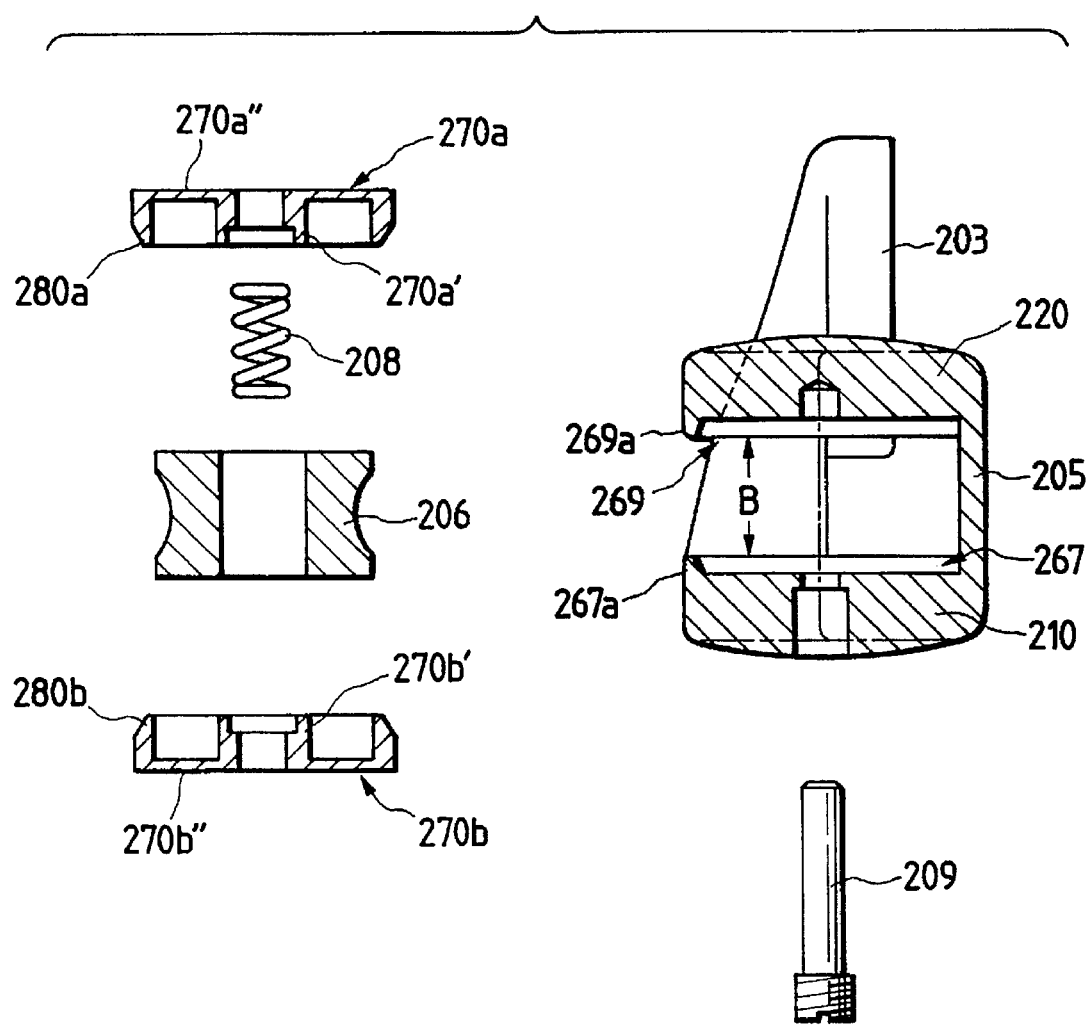
FIG. 23 is an exploded, sectional view of a line roller fitting structure according to a sixth embodiment of the present invention.

FIG. 23 shows a line roller fitting structure according to a sixth embodiment of the present invention, which is a modification of the fourth embodiment. In the sixth embodiment, recessed portions 267 and 269 are provided respectively in opposite end faces of the support portion 210 and the bail mounting portion 220 so as to form peripheral walls 267a and 269a. In contrast to the peripheral walls 67a and 69a in the first embodiment, each of the peripheral walls 267a, 269a of the recessed portions 267, 269 is formed into a closed, complete circle concentric or coaxial with respect to an axis about which the line roller 206 is rotatably supported by the bail support member 203. Thus, no cutaway portion is provided in each of the peripheral walls 267a and 269a. Cover members 270a and 270b of this embodiment are similar in construction to the cover member 207b of the fourth embodiment, but the axial length of each central shaft portion 270a', 270b' is slightly shorter than the axial length of the central shaft 207b' of the cover member 207 whereas the axial length of each annular protrusion 280a, 280b is slightly longer than the axial length of the annular protrusion 230b of the cover member 207b. The dimension of the cover members 270a, 270b, line roller 206, and recessed portions 267, 269 in this embodiment is so determined that, when the cover members 270a and 270b are depressed toward each other against the biasing force of the spring member 208 with the liner roller 206 be interposed therebetween, the axial distance defined between outer surfaces 270a" and 270b" of the cover members 270a and 270b becomes slightly shorter than the axial distance B defined between distal ends of the peripheral walls 267a and 267b of the recessed portions 267 and 269 to enable the insertion of the combined assembly of the line roller 206 and cover members 270a and 270b into the insides of the recessed portions 269 and 267. When the depression force is removed after the combined assembly of the line roller 206 and cover members 270a and 270b has been inserted into the recessed portions 269 and 267 in the above-described manner, the cover members 270a and 270b are axially moved away from each other due to the biasing force of the spring member 208 so that the annular protrusions 280a and 280b of the cover members 270a and 270b are respectively received by the recessed portions 267 and 269 while the central shaft portions 270a' and 270b' support the line roller 206, whereby the combined assembly of the line roller 206 and cover members 270a, 270b can be retained in the recessed portions 267 and 269. Under this retained state of the combined assembly, the screw 209 is tightened to the support portion 210 so that the line roller 206 is rotatably supported onto the bail support member 203.

Figure 24:
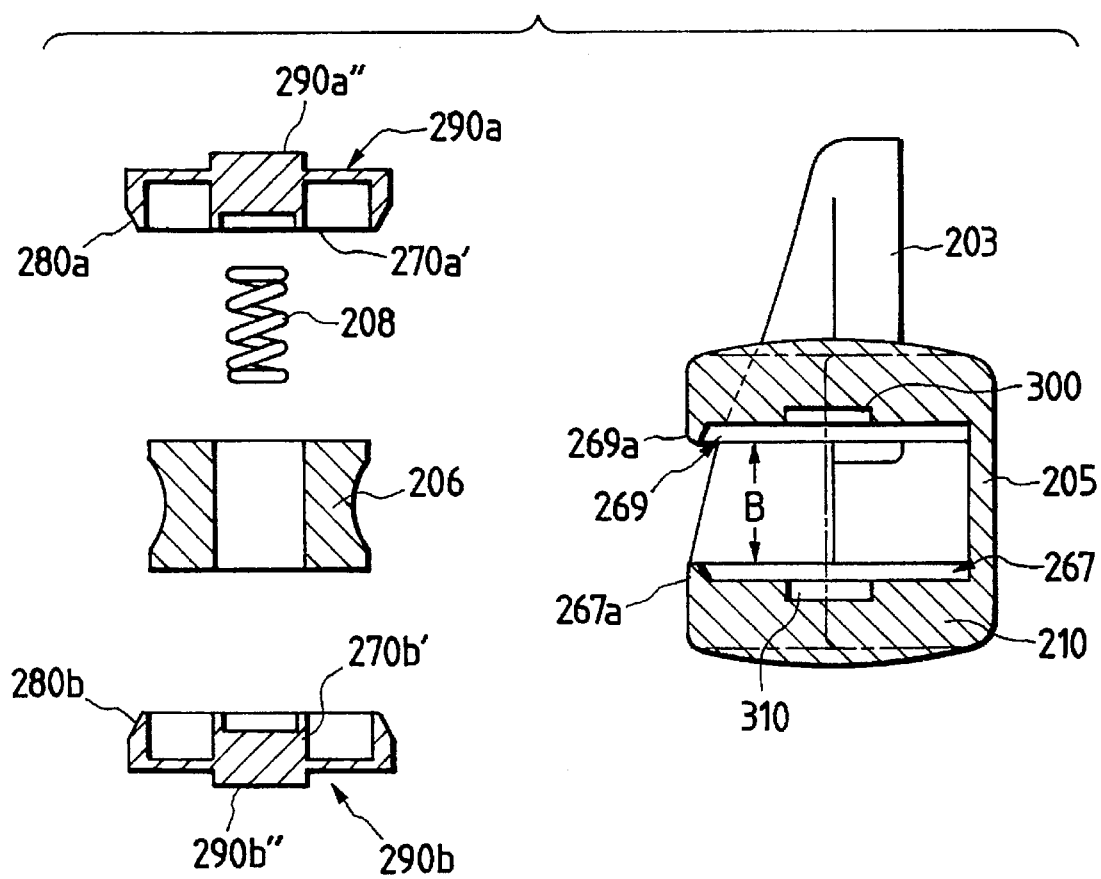
FIG. 24 is an exploded, sectional view of a line roller fitting structure according to a seventh embodiment of the present invention.

FIG. 24 shows a line roller fitting structure according to a seventh embodiment of the present invention, which is a modification of the sixth embodiment, wherein the screw 209 in the sixth embodiment for rotatably supporting the line roller 206 onto the bail support member 203 is dispensed with. Each of cover members 290a and 290b has substantially the same construction as that of the cover member 270a, 270b of the sixth embodiment, but a through hole through which the screw member 209 can pass is not formed in the cover member 290a, 290b. In stead, solid shaft portions 290a", 290b" are projectingly formed respectively on the cover members 290a and 290b. Further, in place of a blind hole and a threaded hole provided in the bail support member 203 for the screw 209 in the sixth embodiment, a pair of blind holes 300 and 310 for receiving respective shaft portions 290a" and 290b" are formed in the bottoms of the recessed portions 269 and 267.

The dimension of the cover members 290a, 290b, line roller 206, and recessed portions 267, 269 in this embodiment is so determined that, when the cover members 290a and 290b are depressed toward each other against the biasing force of the spring member 208 with the liner roller 206 be interposed therebetween, the axial distance defined between outer surfaces of the solid shaft portions 290a" and 290b" of the cover members 290a and 290b becomes slightly shorter than the axial distance B defined between distal ends of the peripheral walls 267a and 267b of the recessed portions 267 and 269 to enable the insertion of the combined assembly of the line roller 206 and cover members 270a and 270b into the insides of the recessed portions 269 and 267. When the depression force is removed after the combined assembly of the line roller 206 and cover members 270a and 270b has been inserted into the recessed portions 269 and 267 in the above-described manner, the cover members 290a and 290b are axially moved away from each other due to the biasing force of the spring member 208 so that the annular protrusions 280a and 280b of the cover members 290a and 290b are respectively received by the recessed portions 267 and 269 while the central shaft portions 270a' and 270b' support the line roller 206 as well as the shaft portions 290a" and 290b" are rotatably received respectively in the blind holes 300 and 310, whereby the line roller 206 is rotatably supported by the bail support member 203 without use of the screw 209.

As described above, the spinning reel for fishing according to the present invention requires no tapped holes in the support portion constituting the bail support member unlike the conventional spinning reel requiring such tapped holes for use in detachably mounting the line roller. Therefore, it is possible to render the support portion compact.

Thus, the bail support member does not adversely affects both the rotational balance of the rotor rotating at high speed during winding and the reversing operation for the bail. Since the exterior of the support portion can be made smooth, the fishline is effectively prevented from becoming entangled, and further, the exterior of the bail supporting member can be made neat in view of design-making.

What is claimed is:

1. A spinning reel for fishing comprising:

a spool supported on a reel body;

a rotor rotatably mounted on said reel body for winding a fishline onto said spool;

a line roller for guiding said fishline to said spool when said rotor is rotated to wind said fishline onto said spool;

a bail support member for supporting said line roller for rotation about a rotational axis, said bail support member having a support portion and a bail mounting portion, both of which are integrally formed with a leading end of said bail support member, said bail support member being pivotable with respect to said rotor, and defining a space between said support portion and said bail mounting portion;

access means for permitting said line roller to be inserted into said space in a direction orthogonal to said rotational axis; and retaining means for retaining said line roller onto said bail support member when said line roller is inserted into said space through said access means.

2. A spinning reel according to claim 1, wherein said access means includes a pair of recessed portions respectively formed in opposite end faces of said support portion and bail mounting portion, each of said recessed portions having a peripheral wall formed into a U-shape to provide a cut-away portion through which said line roller is inserted into said space in said direction.

3. A spinning reel according to claim 2, wherein said retaining means includes a screw extending between said support portion and said bail mounting portion and coaxial with respect to said rotational axis.

4. A spinning reel according to claim 2, wherein said retaining means includes a cover member fitted to said cutaway portions and screw means for fixing said cover member onto said bail support member.

5. A spinning reel according to claim 2, wherein each said cut-away portion faces said spool.

6. A spinning reel according to claim 2, wherein said recessed portions prohibit removal of said line roller in any direction other than said direction.

7. A spinning reel according to claim 2, wherein said line roller has a lateral length larger than a first distance between said opposite end faces of said support portion and bail mounting portion and smaller than a second distance between said recessed portions.

* * * * *